United States Patent
Kavanaugh et al.

(10) Patent No.: US 9,037,724 B2
(45) Date of Patent: May 19, 2015

(54) METHOD AND SYSTEM FOR FORWARDING DATA BETWEEN NETWORK DEVICES

(75) Inventors: Richard Kavanaugh, Encinitas, CA (US); Andrew Hasley Watson Mitchell, North Vancouver (CA); Gustav Gerald Vos, Surrey (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 0 days.

(21) Appl. No.: 13/368,914

(22) Filed: Feb. 8, 2012

(65) Prior Publication Data

US 2012/0203909 A1 Aug. 9, 2012

Related U.S. Application Data

(60) Provisional application No. 61/440,761, filed on Feb. 8, 2011.

(51) Int. Cl.
  *G06F 15/173* (2006.01)
  *H04L 29/12* (2006.01)
(52) U.S. Cl.
  CPC ........ *H04L 61/2514* (2013.01); *H04L 61/2517* (2013.01)
(58) Field of Classification Search
  CPC ............ H04L 61/2514; H04L 61/2517; H04L 63/205; G06F 15/173
  USPC .................................. 709/226; 370/389, 401
  See application file for complete search history.

(56) References Cited

U.S. PATENT DOCUMENTS

| | | | |
|---|---|---|---|
| 4,825,193 A | 4/1989 | Siwiak et al. | |
| 5,481,254 A | 1/1996 | Gaskill et al. | |
| 5,606,668 A | 2/1997 | Shwed | |
| 5,996,021 A | 11/1999 | Civanlar et al. | |
| 6,049,834 A | 4/2000 | Khabardar et al. | |
| 6,058,431 A | 5/2000 | Srisuresh et al. | |

(Continued)

FOREIGN PATENT DOCUMENTS

| | | |
|---|---|---|
| CA | 2248577 | 11/2002 |
| CA | 2172372 C | 12/2005 |

(Continued)

OTHER PUBLICATIONS

"Requirements for Internet Hosts—Communication Layers," Oct. 1989, R. Braden, Internet Engineering Task Force, http://www.ietf.org/rfc/rfc1122.

(Continued)

*Primary Examiner* — Vivek Srivastava
*Assistant Examiner* — Karina J Garcia-Ching
(74) *Attorney, Agent, or Firm* — Holland & Hart LLP

(57) ABSTRACT

A method and system for forwarding data between network devices is provided. A routing device receives, identifies and forwards data to a network device coupled to a private network. The routing device may make a determination of how to forward the data, for example by determining which of several delivery mechanisms to use. The network device may be also associated with a public network via a public network device identifier (PNDI). The PNDI may include a public IP address of the routing device, a public first port number such as a destination port number, and optionally a public second port number such as a source port number, the combination of public IP address and public port number(s) being unique to the network device.

25 Claims, 6 Drawing Sheets

(56) References Cited

U.S. PATENT DOCUMENTS

| | | |
|---|---|---|
| 6,101,189 A | 8/2000 | Tsuruoka |
| 6,161,144 A | 12/2000 | Michels et al. |
| 6,182,185 B1 | 1/2001 | Stokes |
| 6,363,421 B2 | 3/2002 | Barker et al. |
| 6,453,357 B1 | 9/2002 | Crow et al. |
| 6,453,358 B1 | 9/2002 | Michels et al. |
| 6,549,519 B1 | 4/2003 | Michels et al. |
| 6,553,000 B1 | 4/2003 | Ganesh et al. |
| 6,579,663 B2 | 6/2003 | Wolf et al. |
| 6,606,316 B1 | 8/2003 | Albert et al. |
| 6,618,757 B1 | 9/2003 | Babbitt et al. |
| 6,631,416 B2 | 10/2003 | Bendinelli et al. |
| 6,680,943 B1 | 1/2004 | Gibson |
| 6,687,252 B1 | 2/2004 | Bertrand et al. |
| 6,711,147 B1 | 3/2004 | Barnes et al. |
| 6,751,191 B1 | 6/2004 | Kanekar et al. |
| 6,804,707 B1 | 10/2004 | Ronning |
| 6,865,184 B2 | 3/2005 | Thubert et al. |
| 6,888,927 B1 | 5/2005 | Cruickshank et al. |
| 6,937,863 B1 | 8/2005 | Gordon et al. |
| 6,944,672 B2 | 9/2005 | Crow et al. |
| 6,954,790 B2 | 10/2005 | Forslow |
| 6,956,854 B2 | 10/2005 | Ganesh et al. |
| RE38,902 E | 11/2005 | Srisuresh et al. |
| 6,993,595 B1 | 1/2006 | Luptowski et al. |
| 6,996,628 B2 | 2/2006 | Keane et al. |
| 6,999,753 B2 | 2/2006 | Beckmann et al. |
| 7,023,847 B2 | 4/2006 | Zhang |
| 7,028,333 B2 | 4/2006 | Tuomenoksa et al. |
| 7,031,328 B2 | 4/2006 | Thubert et al. |
| 7,043,564 B1 | 5/2006 | Cook et al. |
| 7,051,116 B1 | 5/2006 | Rodriguez-Val et al. |
| 7,058,973 B1 | 6/2006 | Sultan |
| 7,068,667 B2 | 6/2006 | Foster et al. |
| 7,076,594 B2 | 7/2006 | Benedetto et al. |
| 7,085,854 B2 | 8/2006 | Keane et al. |
| 7,126,948 B2 | 10/2006 | Gooch et al. |
| 7,139,822 B2 | 11/2006 | Guenther et al. |
| 7,139,828 B2 | 11/2006 | Alkhatib et al. |
| 7,159,109 B2 | 1/2007 | Egevang |
| 7,177,657 B2 | 2/2007 | Hill et al. |
| 7,181,766 B2 | 2/2007 | Bendinelli et al. |
| 7,190,696 B1 | 3/2007 | Manur et al. |
| 7,197,661 B1 | 3/2007 | Reynolds et al. |
| 7,215,777 B2 | 5/2007 | Deen et al. |
| 7,237,260 B2 | 6/2007 | Yu et al. |
| 7,245,622 B2 | 7/2007 | Huitema |
| 7,266,119 B2 | 9/2007 | Fan et al. |
| 7,269,663 B2 | 9/2007 | Beier et al. |
| 7,272,650 B2 | 9/2007 | Elgebaly et al. |
| 7,293,108 B2 | 11/2007 | Warrier et al. |
| 7,302,493 B1 | 11/2007 | Alles et al. |
| 7,313,618 B2 | 12/2007 | Braemer et al. |
| 7,333,453 B2 | 2/2008 | Wu et al. |
| 7,340,535 B1 | 3/2008 | Alam |
| 7,356,045 B2 | 4/2008 | Satapati et al. |
| 7,362,760 B2 | 4/2008 | Wang |
| 7,366,188 B2 | 4/2008 | Kim |
| 7,370,194 B2 | 5/2008 | Morais et al. |
| 7,379,475 B2 | 5/2008 | Minami et al. |
| 7,386,641 B2 | 6/2008 | Xu et al. |
| 7,406,534 B2 | 7/2008 | Syvanne et al. |
| 7,411,917 B1 | 8/2008 | Hardie et al. |
| 7,411,975 B1 | 8/2008 | Mohaban |
| 7,426,194 B2 | 9/2008 | Shenfield et al. |
| 7,441,043 B1 | 10/2008 | Henry et al. |
| 7,443,859 B2 | 10/2008 | Sengodan |
| 7,443,867 B2 * | 10/2008 | El-Beik et al. ................ 370/401 |
| 7,461,142 B2 | 12/2008 | Wadekar |
| 7,464,121 B2 | 12/2008 | Barcia et al. |
| 7,483,999 B2 | 1/2009 | Weyman |
| 7,484,005 B2 | 1/2009 | Rodriguez-Val et al. |
| 7,523,197 B2 | 4/2009 | Castaneda et al. |
| 7,529,230 B2 | 5/2009 | Lewis |
| 7,529,810 B2 | 5/2009 | Goto et al. |
| 7,558,877 B1 | 7/2009 | Fedyk et al. |
| 7,577,746 B2 | 8/2009 | Shima |
| 7,587,209 B2 | 9/2009 | Bianconi et al. |
| 7,587,490 B2 | 9/2009 | Guenther et al. |
| 7,606,191 B1 | 10/2009 | Breau et al. |
| 7,606,588 B2 | 10/2009 | Griffin |
| 7,609,701 B2 | 10/2009 | Yang et al. |
| 7,684,397 B2 * | 3/2010 | Kim et al. ................ 370/389 |
| 7,702,646 B2 | 4/2010 | Rabines et al. |
| 7,756,074 B2 | 7/2010 | Beckmann et al. |
| 7,949,785 B2 | 5/2011 | Alkhatib et al. |
| 8,050,684 B2 | 11/2011 | Lewis |
| 8,228,848 B2 | 7/2012 | Vos et al. |
| 8,301,753 B1 | 10/2012 | Melvin |
| 8,458,067 B2 | 6/2013 | Arguelles et al. |
| 8,532,609 B2 | 9/2013 | Spector |
| 2001/0052006 A1 | 12/2001 | Barker et al. |
| 2002/0004834 A1 | 1/2002 | Guenther et al. |
| 2002/0026503 A1 | 2/2002 | Bendinelli et al. |
| 2002/0026531 A1 | 2/2002 | Keane et al. |
| 2002/0029276 A1 | 3/2002 | Bendinelli et al. |
| 2002/0056008 A1 | 5/2002 | Keane et al. |
| 2002/0091859 A1 | 7/2002 | Tuominoksa et al. |
| 2002/0107980 A1 | 8/2002 | Kawaguchi |
| 2002/0111180 A1 | 8/2002 | Hogan et al. |
| 2002/0114286 A1 | 8/2002 | Iwamura et al. |
| 2002/0129165 A1 | 9/2002 | Dingsor et al. |
| 2002/0131395 A1 | 9/2002 | Wang |
| 2002/0138622 A1 | 9/2002 | Dorenbosch et al. |
| 2002/0143773 A1 | 10/2002 | Spicer et al. |
| 2002/0184316 A1 | 12/2002 | Thomas et al. |
| 2003/0007486 A1 | 1/2003 | March et al. |
| 2003/0108055 A1 | 6/2003 | Damon et al. |
| 2003/0177236 A1 | 9/2003 | Goto et al. |
| 2003/0182448 A1 | 9/2003 | Gooch et al. |
| 2003/0223449 A1 | 12/2003 | Hill et al. |
| 2004/0122929 A1 | 6/2004 | Wadekar |
| 2004/0148406 A1 | 7/2004 | Shima |
| 2004/0153858 A1 | 8/2004 | Hwang |
| 2004/0176112 A1 | 9/2004 | Beckmann et al. |
| 2005/0018651 A1 | 1/2005 | Yan et al. |
| 2005/0021603 A1 | 1/2005 | Yokomitsu et al. |
| 2005/0027875 A1 | 2/2005 | Deng |
| 2005/0068980 A1 | 3/2005 | Mathew et al. |
| 2005/0198383 A1 | 9/2005 | Rose et al. |
| 2006/0018283 A1 | 1/2006 | Lewis et al. |
| 2006/0036765 A1 | 2/2006 | Weyman |
| 2006/0059495 A1 | 3/2006 | Spector |
| 2006/0095969 A1 | 5/2006 | Portolani et al. |
| 2006/0129698 A1 | 6/2006 | Rodriguez-Val et al. |
| 2006/0190587 A1 | 8/2006 | Sylvest et al. |
| 2006/0209822 A1 | 9/2006 | Hamamoto et al. |
| 2007/0136463 A1 | 6/2007 | Guenther et al. |
| 2007/0162457 A1 | 7/2007 | Barcia et al. |
| 2007/0195800 A1 | 8/2007 | Yang et al. |
| 2007/0214256 A1 | 9/2007 | Castaneda et al. |
| 2007/0226295 A1 | 9/2007 | Haruna et al. |
| 2007/0250565 A1 | 10/2007 | Minow |
| 2007/0268829 A1 | 11/2007 | Corwin et al. |
| 2007/0288613 A1 | 12/2007 | Sudame et al. |
| 2007/0294416 A1 | 12/2007 | Agre et al. |
| 2007/0297430 A1 | 12/2007 | Nykanen et al. |
| 2008/0005310 A1 | 1/2008 | Xu et al. |
| 2008/0037534 A1 | 2/2008 | Shina |
| 2008/0052395 A1 | 2/2008 | Wright et al. |
| 2008/0057992 A1 | 3/2008 | Griffin |
| 2008/0098088 A1 | 4/2008 | Tamano et al. |
| 2008/0120512 A1 | 5/2008 | Wang |
| 2008/0168181 A1 | 7/2008 | Berkvens et al. |
| 2008/0198850 A1 | 8/2008 | Cooper et al. |
| 2008/0209035 A1 | 8/2008 | Barranco et al. |
| 2008/0209068 A1 | 8/2008 | Herzog et al. |
| 2008/0225865 A1 | 9/2008 | Herzog |
| 2008/0233922 A1 | 9/2008 | Lesrel |
| 2008/0244260 A1 | 10/2008 | Feldman et al. |
| 2008/0246605 A1 | 10/2008 | Pfeffer et al. |
| 2008/0313255 A1 | 12/2008 | Geltner et al. |
| 2009/0034496 A1 | 2/2009 | Ko et al. |
| 2009/0042574 A1 | 2/2009 | Jung et al. |

(56) References Cited

U.S. PATENT DOCUMENTS

| | | |
|---|---|---|
| 2009/0059922 A1 | 3/2009 | Appelman et al. |
| 2009/0061825 A1 | 3/2009 | Neelakantan et al. |
| 2009/0135765 A1 | 5/2009 | Lewis et al. |
| 2009/0144413 A1 | 6/2009 | Khan et al. |
| 2009/0254517 A1 | 10/2009 | Dalton |
| 2009/0282123 A1 | 11/2009 | Fornari |
| 2010/0110956 A1 | 5/2010 | Hepworth et al. |
| 2010/0189103 A1 | 7/2010 | Bachmann |
| 2010/0205260 A1 | 8/2010 | Daskalopoulos et al. |
| 2011/0011024 A1 | 1/2011 | Pellicer |
| 2011/0252145 A1 | 10/2011 | Lampell et al. |
| 2012/0023257 A1 | 1/2012 | Vos et al. |

FOREIGN PATENT DOCUMENTS

| | | |
|---|---|---|
| CN | 101552848 A | 10/2009 |
| EP | 1096739 | 5/2001 |
| EP | 1229442 | 8/2002 |
| EP | 1619868 | 1/2006 |
| GB | 2443501 A | 7/2008 |
| WO | 2002/096128 | 11/2002 |
| WO | WO 03103199 A1 | 12/2003 |
| WO | 2004/006603 | 1/2004 |
| WO | 2004/034715 | 4/2004 |
| WO | 2005/017707 | 2/2005 |
| WO | 2005/018204 | 2/2005 |
| WO | 2005/081499 | 9/2005 |
| WO | 2006/012612 | 2/2006 |
| WO | 2007/123359 A2 | 1/2007 |
| WO | WO 2007107628 A1 | 9/2007 |
| WO | 2007/125434 A2 | 11/2007 |
| WO | WO 2008053030 A1 | 5/2008 |
| WO | 2008/139033 | 11/2008 |
| WO | 2009/127254 | 10/2009 |
| WO | 2010/054471 A1 | 5/2010 |
| WO | 2010/091506 | 8/2010 |
| WO | 2011/054079 | 5/2011 |
| WO | 2012/106820 | 8/2012 |

OTHER PUBLICATIONS

"Requirements for Internet Hosts—Application and Support," Oct. 1989, R. Braden, Internet Engineering Task Force, http://www.ietf.org/rfc/rfc1123.txt.
"Address Allocation for Private Internets," Feb. 1996, Y. Rekhter et al., Internet Engineering Task Force, http://tools.ietf.org/html/rfc1918.
"Dynamic Host Configuration Protocol," Mar. 1997, R. Droms, Internet Engineering Task Force, http://www.ietf.org/rfc/rfc2131.txt.
"IP Network Address Translator (NAT) Terminology and Considerations," Aug. 1999, P. Srisuresh et al., Internet Engineering Task Force, http://tools.ietf.org/html/rfc2663.
"Traditional IP Network Address Translator (Traditional Nat)," Jan. 2001, P. Srisuresh et al., Internet Engineering Task Force, http://www.ietf.org/rfc/rfc3022.txt.
"Session Traversal Utilities for NAT (STUN)," Oct. 2008, J. Rosenberg et al., Internet Engineering Task Force, http://tools.ietf.org/html/rfc5389.
"Network Address Translation—Protocol Translation (NAT-PT)" Feb., 2000, G. Tsirtsis et al., Internet Engineering Task Force, http://www.ietf.org/rfc/rfc2766.txt.
"Device Profile for Web Services," Feb. 2006, Shannon Chan et al., Microsoft Corp., http://specs.xmlsoap.org/ws/2006/02/devprof/devicesprofile.pdf.
"NAT Port Mapping Protocol (NAT-PMP)," Apr. 16, 2008, S. Cheshire and M. Krochmal, http://files.dns-sd.org/draft-cheshire-nat-pmp.txt.
"Zeroconf Host Profile Applicability Statement," Jul. 20, 2001, E. Guttman, Sun Microsystems, http://tools.ietf.org/html/ draft-ietf-zeroconf-host-prof-01.
3rd Generation Partnership Project, Specification Group: TSG Service and System Aspects (TSG-SA), Meeting # 50, Agenda Item 11.13: "LS from CT WG3: Reply LS on direct stage 3 work for NIMTC functionality," (Incoming Letter) Ref. # SP-100664, Dec. 13-15, 2010, ftp://ftp.3gpp.org/tsg_sa/TSG_SA/TSGS_50/Docs/SP-100664.zip.
"PE-ARP: Port Enhanced ARP for IPv4 Address Sharing," Manish Karir, Eric Wustrow, Jim Rees, Networking Research and Development, Merit Network Inc. Ann Arbor, MI 48104 USA, http://ericw.us/trow/pe-arp.pdf.
B. Landfeldt et al. "Providing Scalable and Deployable Addressing in Third Generation Cellular Networks," School of Electrical and Information Engineering and School of Information Technologies, University of Sydney, Australia.
"A solution for Group Based Addressing," 3rd Generation Partnership Project, Huawei, May 2010, 3GPP TSG SA WG2 Meeting #79 TD S2-102271.
"SIP URIs for devices without MSISDN," 3rd Generation Partnership Project, Samsung, May 2010, 3GPP TSG SA WG2 Meeting #79 TD S2-102425.
"MTC Server communicate with MTC Devices without exclusive MSISDN via SMS," 3rd Generation Partnership Project, Huawei, May 2010, 3GPP TSG SA WG2 Meeting #79 TD S2-102270.
"3rd Generation Partnership Project; Technical Specification Group Core Network and Terminals; Value-added Services for SMS (VAS4SMS); Interface and Signalling Flow; (Release 9)," 3rd Generation Partnership Project, Dec. 2009, 3GPP TS 23.142 V9.0.1.
"Reply LS on direct stage 3 work for NIMTC functionality," 3rd Generation Partnership Project, TSG SA Meeting #50, SP-100664, Dec. 2010.
"3rd Generation Partnership Project; Technical Specification Group Services and System Aspects; Service requirements for Machine-Type Communications (MTC); Stage 1 (Release 11)," 3rd Generation Partnership Project, Dec. 2010, 3GPP TS 22.368 V11.0.0.
"3rd Generation Partnership Project; Technical Specification Group Services and System Aspects; System Improvements for Machine-Type Communications; (Release 10)," 3rd Generation Partnership Project, Jul. 2010, 3GPP TR 23.888 V0.5.1.
International Search Report dated May 9, 2012 for Int. Appl. No. PCT/CA2012/050070, 4 pp.
Written Opinion dated May 9, 2012 for Int. Appl. No. PCT/CA2012/050070, 4 pp.
International Search Report dated Sep. 21, 2010 for Int. Appl. No. PCT/CA2010/000704, 3 pp.
Written Opinion dated Sep. 21, 2013 for Int. Appl. No. PCT/CA2010/000704, 4 pp.
Written Opinion dated Jun. 3, 2010 for Int. Appl. No. PCT/CA2010/000182, 4 pp.
Bernard, T., "Nat Port Mapping Protocol (NAT-PMP)," MiniUPnP Project, http://miniupnp.free.fe/, date unknown.
Eronen, P., "TCP Wake-Up: Reducing Keep-Alive Traffic in Mobile IPv4 and IPsec Nat Traversal", Nokia Research Center, Jan. 31, 2008.
Goland, et al., "Simple Service Discovery Protocol" Internet Engineering Task Force, Internet Draft, Oct. 28, 1999.
Schlimmer, J., "A Technical Introduction to the Devices Profile for Web Services", Microsoft Corporation, Web Services Technical Articles, May, 2004.
URL "Universal Plug and Play," Wikipedia entry, http://en.wikipedia.org/w/index.php?title=Universal Plug and Play &oldid=251385724, Nov. 12, 2008.
URL "What is Port Triggering?," http://www.portforward.com/help/porttriggering.htm, author unknown, date unknown.
"WAP Push Architectural Overview," Version Jul. 3, 2001, Published 2001 by Wireless Application Protocol Forum, Ltd.
Du, L., et al. "Intelligent Cellular Network Load Balancing Using a Cooperative Negotiation Approach," IEEE Wireless Communications and Networking (WCNC 2003), New Orleans, Mar. 16-20, 2003, vol. 3, pp. 1675-1679.
Supplementary European Search Report mailed Jun. 12, 2014, for a related European Patent Application No. 10740871.8.
Office Action mailed Mar. 21, 2014, for corresponding U.S. Appl. No. 12/370,421 (US 2010/0205260).
Notice of Allowance mailed Aug. 22, 2014, for corresponding U.S. Appl. No. 12/370,421 (US 2010/0205260).
Notice of Allowance mailed Apr. 11, 2014, for corresponding U.S. Appl. No. 13/109,342 (US 2012/0023257).

* cited by examiner

METHOD AND SYSTEM FOR FORWARDING DATA BETWEEN NETWORK DEVICES

The application claims priority to U.S. Provisional Patent Application Ser. No. 61/440,761, filed Feb. 8, 2011, which is incorporated herein as if set out in full.

TECHNICAL FIELD

The present technology pertains in general to data transfer systems and in particular to addressability of network devices in data transfer systems.

The application claims priority to U.S. Provisional Patent Application Ser. No. 61/440,761, filed Feb. 8, 2012, which is incorporated herein as if set out in full.

BACKGROUND

Many data transfer systems used today for exchanging data between network devices employ packet-switched networks and use communication protocols included in the Internet Protocol (IP) suite. Particulars of definitions of a number of communication protocols are controlled by the Internet Engineering Task Force (IETF) in a series of Request for Comments (RFC) documents. For example, aspects of the Internet protocol suite are defined in RFC 1122 and RFC 1123.

The protocols most used on the Internet today include the Transmission Control Protocol (TCP) and the User Datagram Protocol (UDP) which, while a number of alternatives exist, are widely carried via the IP suite. TCP provides a number of functions not provided by UDP. For example, TCP can be used to ensure that data packets are submitted by a source network device at a rate supported by the intermediate network and destination network device, or that data packets can be transmitted to a destination network device and reassembled in an intended sequence. UDP does not provide the sequencing or flow control addresses to network operators by regulating authorities, have forced solutions that support more network devices on the Internet than there are public IP addresses but yet circumvent limitations due to exhaustion of IPv4 address space.

One solution is to transition the Internet to IP version 6 (IPv6), which provides a vastly increased 128 bit address space. However, in order to provide its benefits network wide, virtually all network infrastructure is required to support IPv6. To date, not all network infrastructure supports IPv6, and upgrades to IPv6 are still ongoing. Adoption of IPv6 is slow because it partially entails costly infrastructure upgrades. IPv6 does not provide an imminent solution to the IPv4 address space dilemma.

Another solution is based on private IP addresses for which a fraction of the IPv4/IPv6 address space has been set aside for special purpose uses in private IP networks. In contrast to a public IP address, a private IP address can be used multiple times in two or more network segments without risk of collision as the private IP addresses are not reachable from a public network. Sending data packets to private IP addresses from devices with public IP addresses is not possible without special provisions provided by some forms of Network Address Translation (NAT), for example. As such private IP addresses are commonly characterized as being not globally routable because no data can be sent to them from public IP addresses without further network configuration. Possible gains from multiple usages of private IP addresses, however, are offset by the comparatively small private address space (the number of private IP addresses) for IPv4 and the complex processing required for addressing private IP addresses.

A similar solution to the above can be carried out for IPv6. However, in this case, a local IP address may be used in place of a private IP address. For example, the local IPv6 address may be a Unique Local Address which is still officially globally reachable. Therefore, there may still be a low risk of collision when using IPv6 local IP addresses. However, IPv6 Unique Local Addresses will not typically be made easily known outside the private network. Therefore, for at least some practical purposes, these addresses may be considered to be sufficiently non-routable from outside of the local network.

Network Address Translation (NAT) mitigates the shortcomings of private networks but increases network complexity and maintenance requirements. A NAT device, typically a router, connects one part of a network (a private network) with another part of a network (a public network). NAT exists in a number of forms: For example, basic NAT simply translates certain IP addresses of a data packet; Network Address Port Translation (NAPT) additionally translates ports. Basic NAT and NAPT, however, require initial communication from a private/local IP address to a public IP address. Bi-directional NAT enables communication from a public IP address into a private network without requiring prior communication from the private/local IP address; NAT-PT enables interconnecting IPv4 and IPv6 networks; and Realm Specific IP (RSIP) overcomes certain issues caused by embedding network addresses in the payload of data packets.

Generally NAT maps one or more private network addresses of outbound (from the private network) data packets to a public IP address associated with the NAT device. For this purpose NAT uses rules stored in translation tables to map destination addresses of outbound data packets and to determine how to reverse map destination addresses of inbound (to the private network) data packets back into private network addresses. Depending on the form of the NAT, rules may be preconfigured or generated in response to outbound data packets and/or only used until they expire. Some forms of NAT also perform port mapping. Private and public IP addresses are defined in RFC 1918. NAT, NAPT, Bi-directional NAT, NAT-PT and Realm Specific IP (RSIP) are described in a number of documents, for example, RFC 2663, RFC 2766 and RFC 3022.

Other extensions have been developed that recoup interconnectivity functions lost due to NAT but which are otherwise available in NAT-free network connections. These extensions typically concern connecting small numbers of network devices to the Internet. Further extensions have been developed in an attempt to enable NAT to connect networks that allow large numbers of network devices with private IP addresses to connect to the Internet and provide a minimum of interconnectivity functions for them. Known extensions are described by B. Landfeldt et al. in "Providing Scalable and Deployable Addressing in Third Generation Cellular Networks", School of Electrical and Information Engineering and School of Information Technologies, The University of Sydney, Australia, as well as in U.S. Pat. Nos. 7,139,828 7362,760. Further documentation referring to or describing various aspects of NAT include the Internet Gateway Device (IGD), Simple Service Discovery Protocol (SSDP), Universal Plug and Play (UPnP), Devices Profile for Web Services (DPWS), NAT-Port Mapping Protocol (NAT-PMP), Zero Configuration Networking (Zeroconf) and Jini™, for example. Existing forms of NAT, however, can be complex, cumbersome and error-prone, and extensions typically fail to provide required scalability or even rudimentary security features.

Furthermore, data may be delivered to network devices, for example, in cellular networks using a Mobile Subscriber Integrated Services Digital Network Number (MSISDN). The MSISDN is used for example in Short Message Service (SMS) communications and when setting up packet-based communications. Some aspects of packet-based communication with or without MSISDN are noted in 3rd Generation Partnership Project, Specification Group: TSG Service and System Aspects (TSG-SA), Meeting #50, Agenda Item 11.13: "LS from CT WG3: Reply LS on direct stage 3 work for NIMTC functionality," (Incoming Letter) Ref. #SP-100664, Dec. 13-15, 2010, ftp://ftp.3gpp.org/tsg_sa/TSG_SA/TSGS_50/Docs/SP-100664.zip, for example. Using SMS and/or MSISDN, however, requires special configuration of network infrastructure and additional network resources which may not be cost and/or network traffic effective.

Although the MSISDN includes 15 decimal digits, several digits are reserved for certain designations which severely reduces the MSISDN address space. The increased use of network devices for machine to machine communication (M2M), for example, for wireless communication with hydro or gas meters, has accelerated MSISDN address space exhaustion. In response some regulating authorities have restricted the use of MSISDN for use with human-to-human (H2H) communication.

Therefore there is a need for a solution that overcomes at least one of the deficiencies in the prior art.

This background information is provided to reveal information believed by the applicant to be of possible relevance to the present technology. No admission is necessarily intended, nor should be construed, that any of the preceding information constitutes prior art against the present technology.

SUMMARY

An object of the present technology is to provide a method and system for forwarding data between network devices. In accordance with one aspect of the present technology, there is provided a method for forwarding data to one or more network devices operatively connected to a private network, the method comprising: receiving data at a routing device, the routing device operatively connected with the private network and a public network; identifying, by the routing device, portions of said received data intended for at least one of the one or more network devices; making a determination of how to forward said identified portions of said received data to the private network for receipt by the at least one of the one or more network devices; and forwarding, by the routing device, said identified portions of said received data to the private network for receipt by the at least one of the one or more network devices based on said determination.

In accordance with another aspect of the present technology, there is provided a method for forwarding data to one or more network devices operatively connected to a private network, the method comprising: associating the one or more network devices with the public network via a public network device identifier (PNDI); receiving data at a routing device, the routing device operatively connected with the private network and a public network; identifying, by the routing device, portions of said received data intended for at least one of the one or more network devices, wherein identifying portions of said received data intended for the network device comprises identifying the PNDI, the PNDI including a public IP address of the routing device and a public first port number; and forwarding, by the routing device, said identified portions of said received data to the private network for receipt by the at least one of the one or more network devices.

In accordance with another aspect of the present technology, there is provided a network system for forwarding data between network devices, the system comprising: one or more network devices operative connected with a private network; and a routing device operatively connected with the private network, the routing device configured to: receive data intended for forwarding to at least one of the one or more network devices, make a determination of how to forward the received data to the at least one of the one or more network devices; and forward the received data from the routing device to the at least one of the one or more network devices based on said determination.

In accordance with another aspect of the present technology, there is provided a network system for forwarding data between network devices, the system comprising: one or more network devices for operative connection with a private network; at least one of the one or more network devices associated with a public network via a public network device identifier (PNDI), the public network device identifier including a public routing device address, a public first port number and a public second port number; and a routing device for operative connection with the private network and a public network; the routing device configured for operative association with the public network via the public routing device address; the routing device configured to forward to the private network, for receipt by the at least one of the one or more network devices, each received data packet associated with the PNDI, wherein a destination network address corresponds with the public routing device address, a destination port number corresponds with the public first port number and optionally a source port number corresponds with the public second port number.

In accordance with an aspect of the present technology, there is provided a computer program product comprising a computer readable memory storing computer executable instructions thereon that when executed by a computer perform one or more methods as described herein.

DETAILED DESCRIPTION OF THE TECHNOLOGY

Definitions

Figure 1:
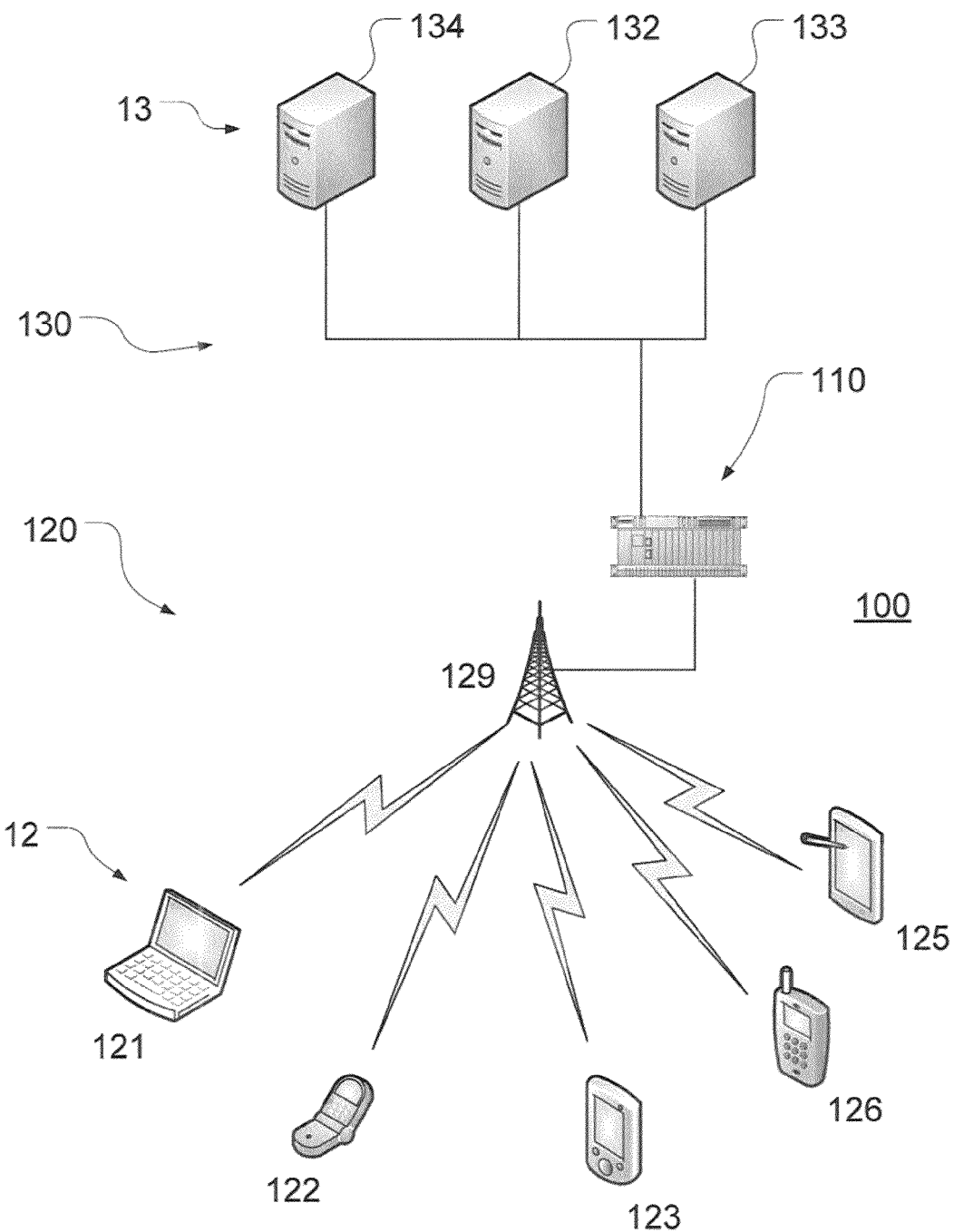
FIG. 1 illustrates a schematic network architecture diagram for employment of embodiments of the present technology.

As used herein, the term "network" refers to an operative interconnection of data processing devices including desktop, notebook, server or super-computers, personal digital assistants (PDAs), mobile phones, smart phones, digital cameras, smart meters, monitoring devices sensing devices or other digital, H214 or M2M network devices or a combination thereof by means of one or more network connection media that employ a packet-switched, circuit-switched or other data delivery mechanism. Network connection media may include wired or wireless interconnections, wherein network connection media can include for example, electrical transmission lines, waveguides, fiber-optic media, laser communication systems, radio and/or micro wave systems, and infrared systems. Two or more networks may be interconnected, hierarchically or otherwise organized and collectively referred to as one network. Furthermore, different networks can have different network topologies.

As used herein, the term "private IP address" can refer to an IP address which is not directly routable from outside of a predetermined network boundary, such as a private IPv4 address. The term "private IP address" can also refer to a local IP address, such as an IPv6 address which, although it is technically routable from outside of a predetermined network boundary, the information regarding such routing is not generally made publicly available outside of the network boundary. In some cases below, the potential for private IP addresses to be local IP addresses has been emphasized below by referring to them as "private/local" addresses.

As used herein, the term "private network" can refer to a network comprising devices with private IP addresses, local IP addresses, or both. A private network may thus, in some instances, be regarded as a "local network" comprising devices with local IP addresses.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology can be employed to communicate with a network device in a private network via a public network device identifier (PNDI) associated with the network device. The present technology can be used to communicate with the network device via a suitably configured routing device based on the PNDI from a public network that uses public IP addresses (public network) and/or a private network. Depending on the embodiment, network devices associated with the private network may or may not use private/local IP addresses.

According to embodiments, communication of data to/from a network device in a private network via a PNDI can be established via a packet or non-packet based data protocol, a circuit-switched or packet-switched data protocol, an IP or non-IP based data protocol or another data protocol. Depending on the embodiment, data communication with a network device in the private network based on the PNDI may be possible from outside and/or from within the private network. According to some embodiments, one or more data protocols (DPs) may be established as needed to facilitate data communication. Depending on the embodiment, the DP may be a packet data protocol (PDP) or other protocol, the DP may be packet switched and/or circuit switched.

According to some embodiments, one or more DPs may be torn down if no longer needed. Depending on the embodiment, establishment of a DP may include set up of a X.25, Frame Relay, point-to-point (PPP) protocol, evolved packet system (EPS) bearer, one or more link layer protocols, similar or other protocols. Depending on the embodiment, the private network can be IP based or at least partially non-IP based. Depending on the embodiment, data may be communicated to/from the network device irrespective of whether an IP connection has been established between the network device and the private network without and/or before a private/local IP address has been assigned to the network device. Depending on the embodiment, the private network may be a cellular network or other network.

According to some embodiments, the PNDI comprises a public IP address of the routing device, a public first port number, for example associated with a TCP/UDP destination port number, and a public second port number, for example associated with a TCP/UDP source port number, associated with the network device for communication. As such the IP address and the port numbers of the PNDI can be used to address network devices and to distinguish among network devices in the private network. According to some embodiments, the PNDI comprises the public IP address of the routing device and the public first port number, but not necessarily the public second port number.

According to various embodiments, the public IP address of the routing device may correspond to the IP address in a packet header of a data packet received at the routing device. The public first port number may correspond with a TCP or UDP destination port number of a packet header of a data packet received at the routing device. The public second port number may correspond with a TCP or UDP source port number of a packet header of a data packet received at the routing device. While the public IP address specifies the routing device, the first and second port numbers may be used to identify one or more particular network devices serviced by that particular routing device.

Depending on the embodiment, the PNDI can be configured to provide an address space that is larger than that provided by the private/local IP address space provided by IPv4 and/or IPv6 or similar configured networks. According to an embodiment, the routing device may be assigned more than one public IP address for use in PNDIs to further increase address space provided based on such PNDIs. According to embodiments, the PNDI can be used to address network devices on an application network protocol layer, in Uniform Resource Identifiers (URIs) such as SIP:PNDI@networkoperator.com, www.networkoperator.PNDI or other URIs, a domain specific Uniform Resource Name (URN), Network Access Identifier (NAI), and/or a Fully Qualified Domain Name (FQDN), for example.

According to embodiments, and as further described herein, each public network device identifier is mapped to a network device identifier available in the private network. In some embodiments, the mapping of the PNDI may be to a public (e.g. IMEI, MSISDN, ICCID) network identifier which is available in the private network. In some embodiments, the mapping of the PNDI may be to a private (e.g. IMSI) network identifier. The network identifier may be non-IP based. Depending on the embodiment, the private network device identifier can be IP based and/or at least partially non-IP based. In cellular private networks, examples of non-IP based network identifiers may include the MSISDN, the International Mobile Subscriber Identity (IMSI), the International Mobile Equipment Identifier (IMEI) or the Integrated Circuit Card ID (ICCID) associated with the network device. As such, the public network device identifiers may be used in association or in place of MSISDNs or other forms of network identifiers, for example. Accordingly, services such as SMS, a Unstructured Supplementary Service Data (USSD), Multimedia Messaging Service (MMS), Cell Broadcasting Service (CBS), paging and so forth in cellular network systems which are today dependent on non-IP based network identifiers may be employed to forward data in the private network and/or the private network may be configured to employ PNDIs for such services rather than MSISDNs. When multiple services or mechanisms are supported by a private network to forward data to network devices, a routing device in the private network may make the determination of which delivery mechanism or mechanisms to use to forward the data to the network devices.

According to embodiments, a single public network device identifier may be associated with and used to identify one or more network devices. Depending on the embodiment, a single PNDI may be associated with a group of two or more network devices. As such, a single PNDI may be used to broadcast or multicast data to two or more network devices. Using one PNDI to address groups of network devices may provide for efficient communication and substantially reduced network traffic, which may be useful to communicate with M2M or other types of network devices, for example. As such, network devices may be grouped by like functionality and/or by network device operator, or other aspects. For example, electricity meters which are under the control of the same utility or operator, may be segmented into one or more groups.

FIG. 1 illustrates an example network system 100 which may be configured so that at least some embodiments of the present technology may be employed in it. The illustration shows a private network 120 connected to a public network 130 via a routing device 110. As illustrated, the private network 120 is configured as a wireless cellular network but can be configured as one or a combination of wireless and wired networks as would be readily understood. The private network 120 includes one or more wireless receiving stations 129 which can be terrestrial or satellite based. The private network can include a number of network devices 12, for example, as illustrated a notebook with cellular modem 121, a cellular phone 122, a smart phone 123, a PDA 126, a tablet computer or handheld device 125, an electricity or natural gas meter (not illustrated) or other digital, M2M or H2H network device. Devices within the private network may be associated with private IP, local IP or public IP addresses. The public network 130 can be configured as a wired and/or wireless network and includes a number of servers 134, 132, and 133, collectively referred to as 13. The public network 130 may provide access to or form part of the Internet. The servers 134, 132, and 133 may use public IP addresses. The routing device 110 can be considered part of the private network 120 as well as part of the public network 130 Routing Device According to embodiments, the routing device provides an operative connection between the private network and the public network. According to embodiments, the routing device may be configured to forward data packets that it receives depending on associations between PNDIs and private network device identifiers. Depending on the embodiment, such associations may be provided by forwarding rules included in one or more translation tables, information included in the received data packets and/or other information. For example, and according to some embodiments, a data packet may include one or more private network device identifiers providing one or more associations between a PNDI and one or more private network device identifiers. According to some embodiments, a routing device can be configured to determine where to forward received data packets based on private network device identifiers that are included in data packets. Depending on the embodiment, the routing device may be configured to validate private network device identifiers provided in data packets against private network device identifiers provided included in one or more translation tables, as described herein, before forwarding the data packets and/or data from the data packets.

According to some embodiments, a translation table or equivalent is included in or otherwise available (e.g. in HSS/HLR) to the routing device and comprises associations between public network device identifiers and private network device identifiers. A translation table may include one or more private network device identifiers per public network device identifier and vice versa. As such the translation table may be structured in various ways to accommodate non-injective relationships between private network device identifiers and public network device identifiers. The routing device may be referred to as a NAT device or firewall that restricts access to a specific network device from the public network as it requires knowledge of the public network device identifier, however, the routing device can be configured in other manners as would be readily understood.

According to some embodiments, addressing via the PNDI may be considered to provide a predetermined security level, as a corresponding network device can only be addressed if its full PNDI is known. For example, network operators/providers may favour use of PNDIs over (static) and globally routable IPv6 addresses of network devices in private networks because knowledge of associations between PNDIs and network devices can be restricted, which may hence mitigate concerns regarding tracking and profiling of network devices—thereby potentially improve privacy, determination of network device addresses when roaming, when changing network operators/providers or when associating network devices with multiple network operators/providers, and/or efficient utilization of network resources.

According to embodiments, the routing device determines if the public network device identifier is included in the translation table or equivalent. If an entry is found, the routing device reads the specific private network device address. This may entail reading the specific first port number, MSISDN, IMSI, IMEI, ICCID and/or other network device designation that are defined in the translation table for the public network device identifier. Information from the private network device identifier is then used for the address and port translation. If no entry is found, the routing device may ignore the data packet or forward the data packet in accordance with other routing rules. For example, if a data packet is designated for delivery to a network device that is associated with a public IP address, the data packet may be forwarded to the private network in accordance with standard IP routing schemes.

According to some embodiments, the translation table look-up is performed based on one or more elements of the public network device identifier. For this purpose, the routing device is configured to search for an entry in the translation table with a public IP address, TCP/UDP source port number and the TCP/UDP destination port number which match the corresponding elements of the public network device identifier. According to an embodiment, the routing device is configured to receive only data packets that have a destination address which matches the routing device's public IP address, in which case the routing device may match only the TCP/UDP source port number and the TCP/UDP destination port number during a translation table look-up.

According to some embodiments, the private network is configured as a cellular network and the routing device is configured to translate the public network device identifier into an MSISDN, IMSI, IMEI, ICCID and/or other device identifier and perform or cause other network components to deliver/forward data packets and/or the data included in the data packets to a network device in the private network.

According to some embodiments, the routing device and/or other components of the private network may be configured to forward data packets and/or perform data delivery to a network device based on the corresponding public network device identifier alone without the use of an MSISDN, IMSI, IMEI, ICCID and/or other designation associated with a cellular network device. Depending on the embodiment, use of the MSISDN, IMSI, IMEI, ICCID and/or other device identifier may be limited to the setup of an IP network protocol context between the routing device and a network device.

According to embodiments, the routing device is configured to forward data packets in accordance with the configuration of the private network via one or more network protocols. For this purpose, the routing device may establish or cause to establish a PPP, EPS bearer, an IP connection or other network connection, for example an IPv4, IPv6, or other packet data protocol (PDP) context With a network device in the private network for which a forwarded data packet is destined. As used herein, a PDP context may also be referred to as packet data network (PDN) connection. The routing device can further forward the data packet, optionally reformat the data packet and/or split the data packet, and/or forward the data included in the data packet in or without combination with data from other data packets and address the network device via IP, and/or employ other PDPs or cellular context, for example using a MSISDN, an IMSI, an IMEI and/or an ICCID, in order to forward the data packet via a corresponding network protocol to a network device. Depending on the embodiment, some or all such steps may be performed by the routing device or in combination with or by other network components.

According to some embodiments, a determination may be made how to forward data and/or data packets to one or more network devices in the private network. For example, a determination may be made by a routing device in the private network, for example, a Device Trigger Gateway (DT-GW), whether to employ one or more data delivery mechanisms including a packet data protocol (PDP) context, a circuit switched data connection, a Short Message Service (SMS), a Cell Broadcast Service (CBS), Non Access Stratum (NAS) protocol messaging, Access Stratum (AS) protocol messaging, IP Multimedia Subsystem (IMS) and/or Session Initiation Protocol (SIP), for forwarding data packets to the network device based upon receipt of the received data packet. One or more data delivery mechanisms may thus be selected by said determination. Depending on the embodiment, such a determination may be made depending on or irrespective of whether one or more of the delivery mechanisms are established or need to be set up. The determination may involve one or more network components and may be made and/or influenced by and/or information obtained from the routing device, the Home Location Register (HLR), the Home Subscriber Server (HSS), an AAA server in the private network and/or other network components, for example. The obtained information may include network operator policy information, subscription information related to the network device, current registration/attachment, reachability and connectivity information of the network device, and the data delivery mechanisms available in the current home and visited networks of the network device, for example. According to some embodiments, such a determination may be based on existence and/or type of existing connection(s) between the private network and a network device to which data is to be forwarded, which may include data and/or signalling connections, for example.

Depending on the embodiment, the routing device may be configured to route data packets only from the private network, only from the public network or irrespective of whether they originate from the private network or the public network.

According to embodiments, the routing device is configured to receive data packets returned by network devices in response to previously forwarded data packets and may forward returned data packets accordingly. Returned data packets may be formatted in accordance with the same network protocol in which previously forwarded data packets were forwarded. Depending on the embodiment, different network protocols may be employed during communications between the routing device and a network device via the private network. Furthermore, such communications may be in a format different from the communication of the routing device with the public network. For example, the routing device may employ a non-IP based network protocol for communication with a network device within the private network. Moreover, depending on the embodiment, the routing device may communicate with different network devices using different network protocols.

Forwarding Rules

According to some embodiments, the routing device is configured to forward data packets based on forwarding rules (FRs). Each forwarding rule comprises two or more components which include a public portion and a private portion. The public portion of an FR includes one public network device identifier and the private portion of the FR includes one private network device identifier. As noted, forwarding rules may be provided via one or more translation tables. Each forwarding rule determines how a specific public network device identifier is associated with one or more specific private network device identifiers and how they can be mapped/translated onto each other in order to enable the sending and receiving of data packets to/from one or more network devices via the public network device identifier.

According to some embodiments, the translation table can be configured and/or reconfigured in a number of ways. Depending on the embodiment, entries in the translation table may be made, added, updated or removed based on subscription data associated with a network device. For example, when a new network device is added, a new or existing public network device identifier may be associated with that network device and a corresponding entry may be made in the translation table. Otherwise the translation table may be updated accordingly whenever the subscription status of a network device changes or the topology of the private network changes (e.g. routing device is added to, modified or removed from the private network). Depending on the embodiment, updates to the translation table may be facilitated by certain network components, for example, account/client management systems which may be used to manage client and/or network device specific information. In some embodiments, a certain network component may be configured to directly or indirectly perform and/or cause updates to a translation table.

Depending on the embodiment, a private network device identifier may include a private network device address, a private first port number and a private second port number, an MSISDN, an IMSI, an IMEI, an ICCID and/or other designation associated with a network device. Depending on the embodiment, the routing device may employ Uniform Resource Identifiers (URIs), Network Access Identifier (NAI), and/or Fully Qualified Domain Names (FQDNs) as aliases for the public network device identifiers in order to deliver data to a cellular network device. The employment of URIs, and/or FQDNs may be used in conjunction with aspects of an IP Multimedia Subsystem (IMS) and/or a Session Initiation Protocol (SIP), for example.

Depending on the embodiment, the private network device identifier may employ TCP/UDP IP addressing elements and/or addressing information of other networking protocols. Depending on the embodiment, irrespective of whether the private network device identifier is IP based, data packet transport between the routing device and a network device may at least in part entail non-IP based data packet transport. For example, small amounts of data may be forwarded to and/or received from a network device in the private network by the routing device and/or other network components via non-IP based communication within the private network, in order to avoid communications required to establish an IP-based association between the network device and the routing device which may save network traffic cost. As such the private network device identifier may be non-IP based. Depending on the embodiment, non-IP based communications with a specific network device within the private network may occur irrespective of whether an IP association with that network device exists and/or independent of the nature of communications with other network devices as described in an example herein.

Name Resolution of the PNDI (Public Network Device Identifier)

According to embodiments, a network system provides limited or full access to a network device via its PNDI. For example, access to a network device via its PNDI may be used for initial communications, such as triggering a device to perform an action or establish communication via another means. In some embodiment, the initial communications may be utilized until a temporary public IP address is assigned to the device. According to some embodiments, associations between URIs, NAIs or FQDNs and public network device identifiers may be defined in a name space. The name space can be configured to provide associate mnemonic names with PNDIs. The name space can be used to define one URI or FQDN per public network device identifier and may be provided by a name resolution service. According to an embodiment, the name resolution service may be provided by the routing device or another network device and may be referred to as a name server.

Depending on the embodiment, the name resolution service may be configured to provide a public network device identifier in response to a URI or FQDN submitted via a corresponding name-resolution request via an adequately configured network protocol. The public network device identifier may be returned to a requesting device which may utilize the response in order to establish communication with the corresponding network device(s) in subsequent data packets in accordance with IPv4 and/or IPv6 network protocols. As such this process resembles communications associated with IP address resolution. According to an embodiment, the URI/FQDN name resolution request may be implemented based on a Domain Name Server with extended functionality, for example.

Network Devices For Association With the Private Network

According to some embodiments, network devices for association with a private network via PNDIs as described herein may be configured in accordance with existing IP network protocol standards or they may need to be configured in a predetermined way. Predetermined configuration may be required in order to support distinguishing more network devices than there are private/local IP addresses available in a private network.

Depending on the embodiment, network devices for association with the private network may be configured to disregard a data packet although the data packet and network device have the same IP address because of the need to discriminate between network devices based on the public network device identifier. As such, a network device may be configured to disregard any data packets with source port and destination port numbers that do not match those specified in the private network device identifier.

Figure 2:
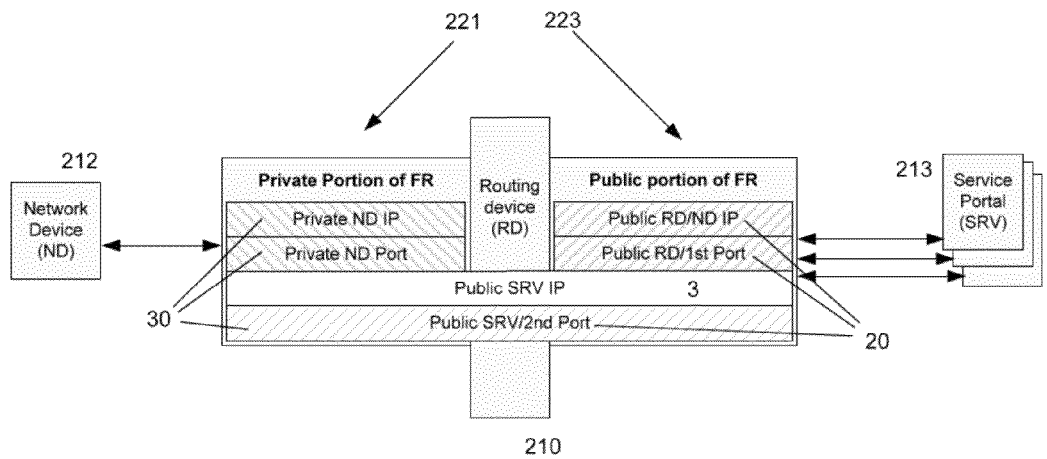
FIG. 2 illustrates elements of a forwarding rule according to some embodiments of the present technology.

FIG. 2 illustrates elements of a forwarding rule (FR) according to some embodiments of the present technology. FIG. 2 illustrates how the public network device identifier 20 is mapped onto a private network device identifier 30. The public network device identifier may be mapped onto more than one network device identifier (not illustrated). The routing device 210 employs TCP/UDP IP network protocol elements for forwarding/receiving data packets into/from the private network. For this purpose the routing device 210 includes a forwarding rule comprising a public portion 223 and an IP-based private portion 221. Depending on the embodiment, the forwarding rule may be provided as an element of a translation table (not illustrated).

The public portion of the FR includes a specific public network device identifier 20 and a public server IP address 3, associated with the service portal 213, which may be provided by a server. The private portion of the FR includes a specific private network device identifier 30 as well as the public server IP address 3. The forwarding rule defines that port numbers and IP addresses for each data packet which traverses the routing device 210 are to be mapped into each other according to the following associations: The public routing device address is mapped to/from the private network device address and the public first port number (the routing device port number) is mapped to/from the private network device port depending on the direction in which the corresponding data packet travels whereas the public server IP address and the public server port remain unchanged.

Figure 3:
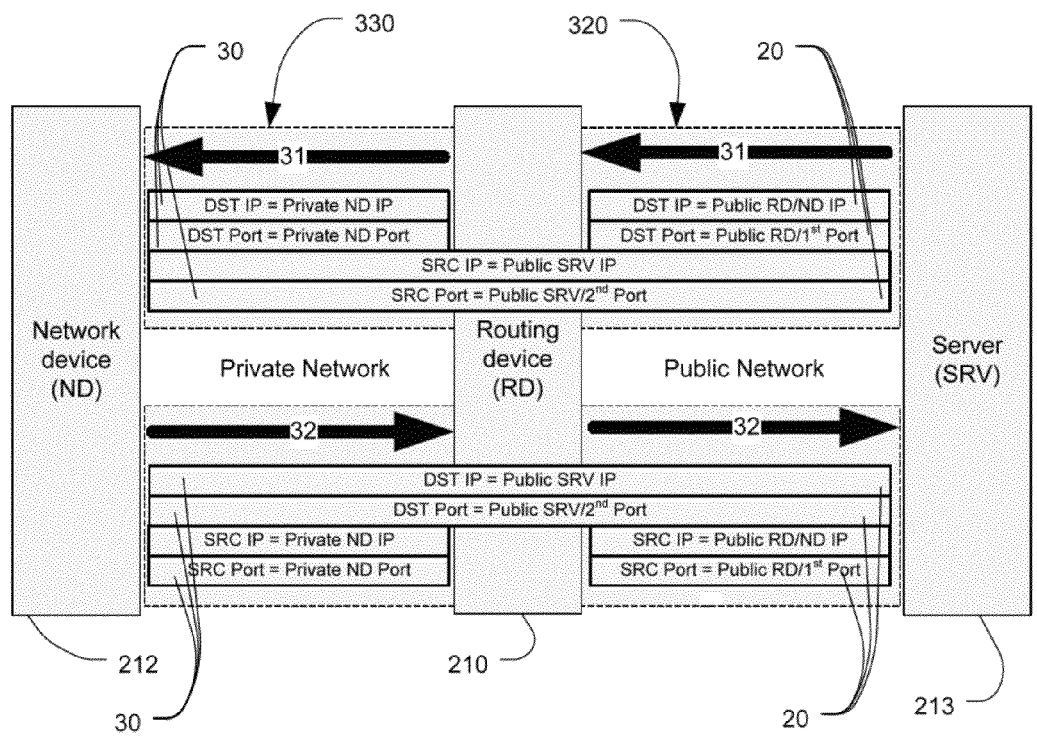
FIG. 3 illustrates an example data flow sequence diagram in accordance with some embodiments of the present technology.

FIG. 3 illustrates an example data flow sequence diagram in accordance with some embodiments of the present technology. The sequence diagram illustrates data packet flow from 31 (downlink) a server 213 to a network device 212 and back 32 (uplink). Indicated are only the ports and IP addresses without the payload of respective data packets 320 and 330 and how, if at all, ports and/or IP addresses are translated by the routing device 210. As illustrated, source (SRC) and destination (DST) port numbers and IP addresses of data packets may be translated when they traverse the routing device 210. Depending on the direction of the data-packet flow, only the destination or the source port number and IP address mapped. Provided there is a corresponding forwarding rule, the specific example routing device 210 translates the destination IP address and the destination port of a data packet during a downlink 31 while it leaves the source IP address and the source port as they are. In contrast, the routing device 210 may only change the source port and source IP address during an uplink subject to the availability of the corresponding forwarding rule. As such and provided the network devices within the private network are adequately configured (as described herein), each network device can be associated with the public network device identifier and data packets can be sent to and received from the network device.

It is noted that if a server is associated with a private network (not illustrated), outgoing data packets from such a server destined for a network device may be routed to the network device by the routing device, provided the data packets employ the public network device identifier that is associated with that network device and the routing device is configured to provide a corresponding routing function for data packets that originate from the private network.

Optionally, when the private network identifier includes at least a portion of an ICCID, the private network is configured to employ the ICCID as a replacement for a mobile subscriber integrated services digital network number (MSISDN).

Optionally, the public network device identifier may be used as a replacement for a mobile subscriber integrated services digital network number (MSISDN) in the private network, wherein the private network is a cellular network.

Optionally, a name resolution service for determining the PNDI associated with a specific network name in a name space is provided by the routing device. The name space may be defined, the name space comprising associations between network names and public network device identifiers.

Optionally, the received data packet is received by the routing device from the public network.

Optionally, the system is configured to define an association between the PNDI and a corresponding private network device identifier; and the router is configured to forward each received data packet associated with the PNDI to the network device identified by the private network device identifier identified by the association.

Optionally, the routing device includes a translation table and is configured to determine the corresponding private network device identifier based on the translation table and a PNDI.

Optionally, a name space is defined, the name space comprising associations between network names and public network device identifiers, and the system further comprises a name resolution service for determining the PNDI associated with a specific network name in the name space. Optionally, the name resolution service is provided by the routing device.

Optionally, the system is further configured to forward data packets to the network device within the private network employing a pre-existing packet-data protocol (PDP) context.

Optionally, the system is further configured to forward data packets to the network device within the private network employing a pre-existing evolved packet subsystem (EPS) bearer.

Optionally, the system is further configured to forward data packets to the network device within the private network employing a circuit switched data connection.

Optionally, the system is further configured to forward data packets to the network device within the private network employing a Short Message Service (SMS).

Optionally, the system is further configured to forward data packets to the network device within the private network employing a Cell Broadcast Service (CBS).

Optionally, the system is further configured to forward data packets to the network device within the private network employing a Session Initiation Protocol (SIP).

Optionally, the routing device is configured to determine one or more data delivery mechanisms including an evolved packet subsystem (EPS) bearer, a circuit switched data connection, a Short Message Service (SMS), a Cell Broadcast Service (CBS), and/or Session Initiation Protocol (SIP), for forwarding data packets to the network device based upon receipt of the received data packet.

Optionally, the routing device is configured to determine one or more of the delivery mechanisms based on an instant connection of the network device with the private network.

Optionally, the routing device is configured to determine the instant connection based on information obtained from one or more network components of the private network.

Optionally, the one or more network components include Home Location Register (HLR) and/or a Home Subscriber Server (HSS).

Optionally, at least one of the one or more network devices is operatively connected with the private network via a private network address selected from a private address realm.

Optionally, the private network, the public network, or both, is configured in accordance with Internet Protocol version 4 (IPv4) or Internet Protocol version 6 (IPv6).

Optionally, the routing device may be configured to receive a request for a public identifier associated with at least one network device of the private network, and to provide a response to the request by the routing device, the response indicative of the public identifier. Optionally, the public identifier may be a PNDI. Additionally or alternatively, the routing device may be one configured to make a determination of how to forward identified portions of received data to the private network for receipt by the at least one network device.

The instant technology will now be described with reference to specific examples. It will be understood that the examples are intended to describe aspects of some embodiments of the technology and are not intended to limit the technology in any way.

EXAMPLE 1

The instant example refers to a network system including a private network configured in accordance with Code Division Multiple Access (CDMA), General Packet Radio Service (GPRS), Universal Mobile Telecommunications System (UMTS), Long Term Evolution (LTE), Third ($3^{rd}$) Generation Partnership Project (3GPP) specifications and/or other specifications. MS refers to a mobile station, UE refers to user equipment, BSS refers to Base Station Subsystem, RNS refers to Radio Network Subsystem, NB refers to Node-B or Base Transceiver Station, eNB refers to evolved Node B, SGSN refers to Serving GPRS Support Node, MME refers to Mobile Management Entity, HLR refers to Home Location Register, HSS refers to Home Subscriber Server, GGSN refers to Gateway GPRS Support Node, S-GW refers to Serving Gateway, P-GW refers to Packet Data Gateway.

Figure 4:
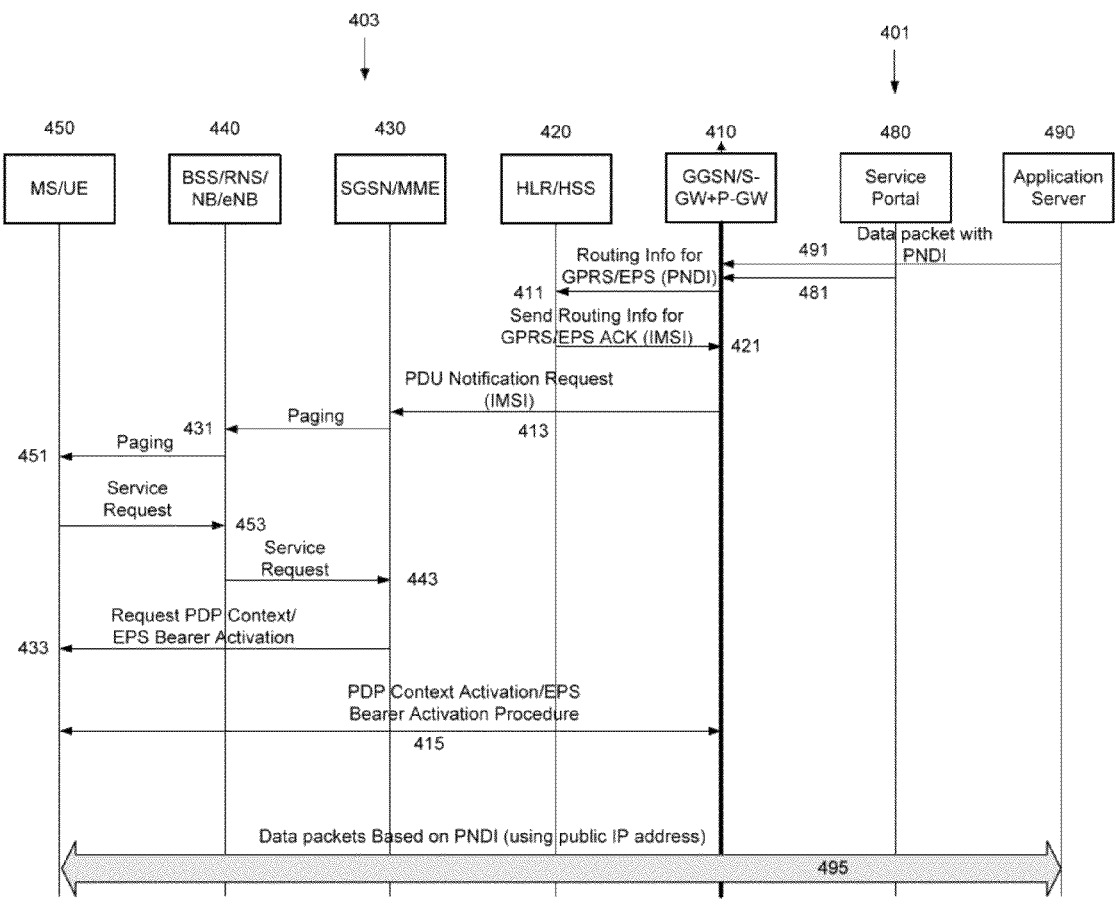
FIG. 4 illustrates a communication diagram for establishing a packet data protocol (PDP) context with a network device in a cellular private network according to some embodiments of the present technology.

FIG. 4 illustrates a communication diagram for establishing a packet data PDP context, for example an EPS bearer equivalent in a 3GPP Evolved Packet System (EPS), with a network device 450 between a public network 401 and a private network 403 according to some embodiments of the present technology. The private network 403 is configured as a cellular network which may employ one or more of each of a GGSN/S-GW+P-GW 410, a HLR/HSS 420, SGSN/MME 430, BSS/RNS/NB/eNB 440 and MS/UE 450. The GGSN/S-GW+P-GW 410 further provides the routing device, also referred to as firewall. The MS/UE 450 refers to a network device.

The public network 401 includes a web service portal on an application server 490 and an optional (web) service portal 480. The service portal/application server 480/490 provides functions for communicating with the network devices in the private network in order to perform certain tasks including maintenance, queries or other communication with the network devices. The service portal/application server 480/490 is configured to submit data packets via the public network 401 and the private network 403 to network devices in the private network 403 based on the PNDI of the network devices. The service portal 480 may be optionally provided in order to facilitate communication between the service portal/application server 480/490 and GGSN/S-GW+P-GW 410.

The illustrated communication employs a PNDI to establish a data connection between the service portal/application server 480/490 when the network device 450 can be registered or attached but no IP-based routable connection to the network device has been established, yet. The cellular network is configured to establish a PDP with the network device 450 and deliver, 491 and/or 481, data packets to the network device 450 without requiring more from the service portal/application server 480/490 than sending data packets based on the PNDI.

In this example, if no PDP context (routable IP connection 495) with the network device 450 does yet exist when the GGSN/S-GW+P-GW 410 receives a data packet based on an existing PNDI, the PNDI is used by the cellular network to determine, 411, 421 and 413, the IMSI of the network device 450 so that the network device 450 can then be paged, 431 and 451, to establish, 453, 443, 433 and 415, a routable IP connection 495. If a PDP context already exists, the cellular network uses it to forward corresponding data packets received by the GGSN/S-GW+P-GW 410. Using the PNDI to reach the network device 450 may be efficient for communicating predetermined amounts of data. Depending on the geographical location of the network device 450 and the GGSN/S-GW+P-GW 410 a new PNDI may be assigned (not illustrated) to the network device 450 to generate a more efficient route for data packet delivery.

If the amount of data is small, for example a trigger or short message sent by the web server portal, the entire communication between the network device 450 and the service portal/application server 490 can take place via the PNDI. The cellular network may be configured to limit communication over an existing PNDI route to an initial phase, which can be used to trigger the network device to setup another routable IP connection within the cellular network (not illustrated). Such a process may be employed, for example, if the application server 490 and network device 450 are located in North America and the PNDI is anchored to a GGSN in Europe.

Rather than using the IMSI for paging, the core network may be configured to determine to page the network device using the PNDI only (not illustrated), or with an alternative identifier or trigger the network device to establish an IP connection through the use of broadcasting, SMS, multicasting and so forth, for example. As such, the network device, while being registered/attached to the network, may be listening for broadcasts or pages on a special channel or time slot.

The network system can be configured to send SMS or other messages to network devices without use of MSISDNs. For this purpose, the network system may be configured to forward SMS messages with a dummy MSISDN, that is without a valid MSISDN or with a predetermined MSISDN, to the SMSC or equivalent network component, which is configured to recognize SMS with the predetermined MSISDN and inspect the payload of such SMS for (an) encoded PNDI(s) to perform the lookup of the network device based on the PNDI. As such, such a network system can provide communication between the appropriate service portal and a network device based on the PNDI.

Furthermore, if a replacement of the MSISDN address space is required, the network system may be configured to employ a predetermined cellular network identifier as the private network device identifier. For example, the SMSC may be configured to employ the IMSI, IMEI, ICCID—including or excluding a mobile network operator (MNO) number, or other cellular network identifier. Use of an existing cellular network identifier may help keep modifications to the cellular network to a predetermined amount. IMSIs as well as IMEIs and ICCIDs can be used to provide a scalable and substantially improved address space over MSISDNs. To avoid use of an ICCID that is unique only within the MNO core domain, which may be the case when SMS aggregators are employed, the ICCID may need to be combined with the MNO number. The MNO number is defined as a public part of the IMSI. Accordingly, corresponding URIs, NAIs or FQDNs may include the ICCID in combination with the MNO number. Like associations can be configured for a PNDI which is associated with two or more network devices. As such a web service portal application can trigger certain network operations, PDP connections, transfer/monitor certain data and/or alarms associated with one or more network devices, determine availability of one or more network devices, or perform other actions per network device or group of network devices.

If the GGSN/S-GW+P-GW 410 determines that an incoming data packet is associated with a group PNDI that is associated with more than one network device, the cellular network is configured to perform operations as noted above in order to establish PDP connections with the MSs/UEs that are members of the group defined by the group PNDI. The cellular network may be configured to perform respective operations one by one for each network device of the group, or the cellular network may broadcast, for example employ a Cell Broadcast Service and/or use System Information from RAN and so forth, or in other ways, to establish a PDP connection with the MSs/UEs of the corresponding group.

Furthermore, the cellular network may be configured to employ an existing network device identifier as the private network device identifier for association with the PNDI. For example, the cellular network may use the ICCIDs of the network devices as a private network device identifier. As such, the cellular network and/or the service portal/application server 480/490 may be configured with corresponding associations between PNDIs and ICCIDs, for example. For this purpose, because there are more unique ICCIDs possible than there are different IPv4-based PNDIs available, a predetermined portion of an ICCID may be associated with a PNDI. For example, PNDI addresses may be associated with a certain digits or a predetermined range of digits of an ICCID in a binary, decimal or other representation of the ICCID.

Figure 5:
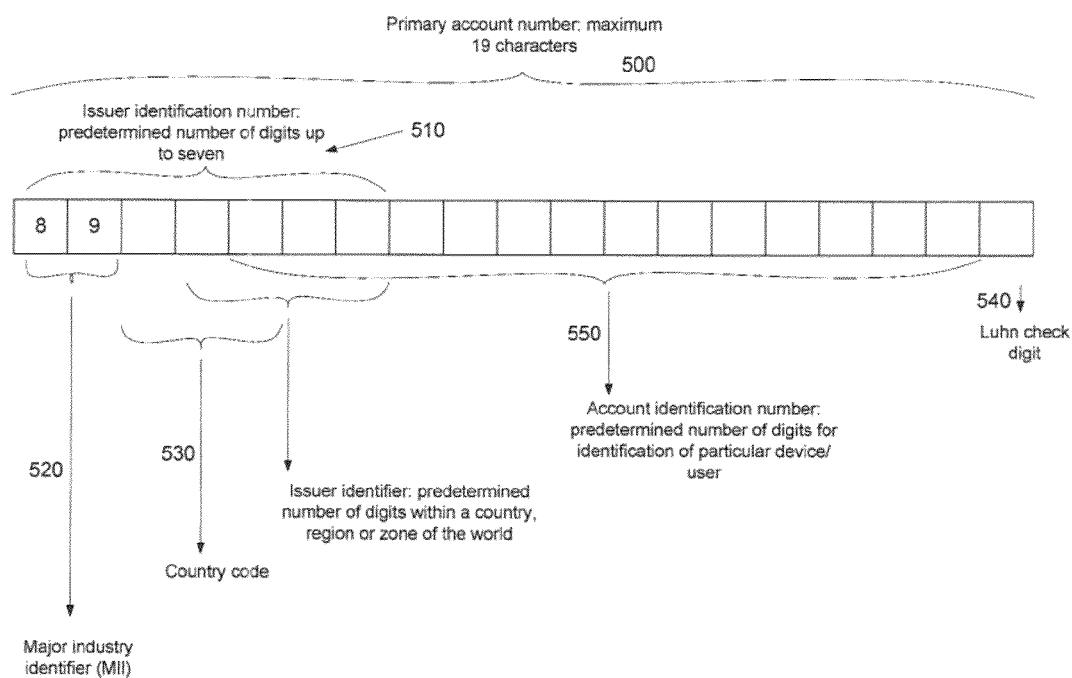
FIG. 5 illustrates the composition of an Integrated Circuit Card ID (ICCID), which can be used in accordance with some embodiments of the present technology.

FIG. 5 illustrates the structure of an ICCID 500. An ICCID includes 19 decimal digits. Depending on the specific type of the cellular network, up to seven of the most significant digits—as referenced by 510, may be associated with various network operator, country or issuer identifiers/codes. For example, the two most significant decimal digits can be associated with an MNO number—as referenced by 520, and the third to fifth most significant digits may represent a country code—as referenced by 530. Furthermore, the least significant digit includes a checksum 540. The rest of the digits 550 are reserved for association with specific network devices and the associated remaining ICCID address space is large enough for unique association with $2^{32}$ PNDIs and beyond.

While a network device may be assigned first and second port numbers for a PNDI before initial operation, for example during manufacture or during subscription, the IP address part of a PNDI may be determined later during subscription of the network device when the network device is activated and access to it is enabled within the cellular network. The cellular network may be configured so that the IP address part of a PNDI may be provided by an MNO directly to the service portal/application server 480/490 and/or via name resolution of a URI, NAI, or FQDN, such as www.MNO.PNDI, for example. In order to extend the address space, the GGSN/S-GW+P-GW 410 can be assigned more than one public IP address for use with PNDIs. As such the number of global routes available via the resulting PNDIs can be multiplied by the number of public IP addresses assigned to GGSN/S-GW+P-GW 410.

Depending on how and when the port information of a PNDI is determined some or all of the private network identifier may need to be communicated in various ways within the public network. This may be relevant if the private network identifier is based on the IMSI or other private identifier of a network device. Provided the cellular network is adequately configured, associations between PNDIs and private network device identifiers can be made without disclosing private identifiers associated with network devices within the cellular network. Like considerations apply to other types of private networks.

EXAMPLE 2

Figure 6:
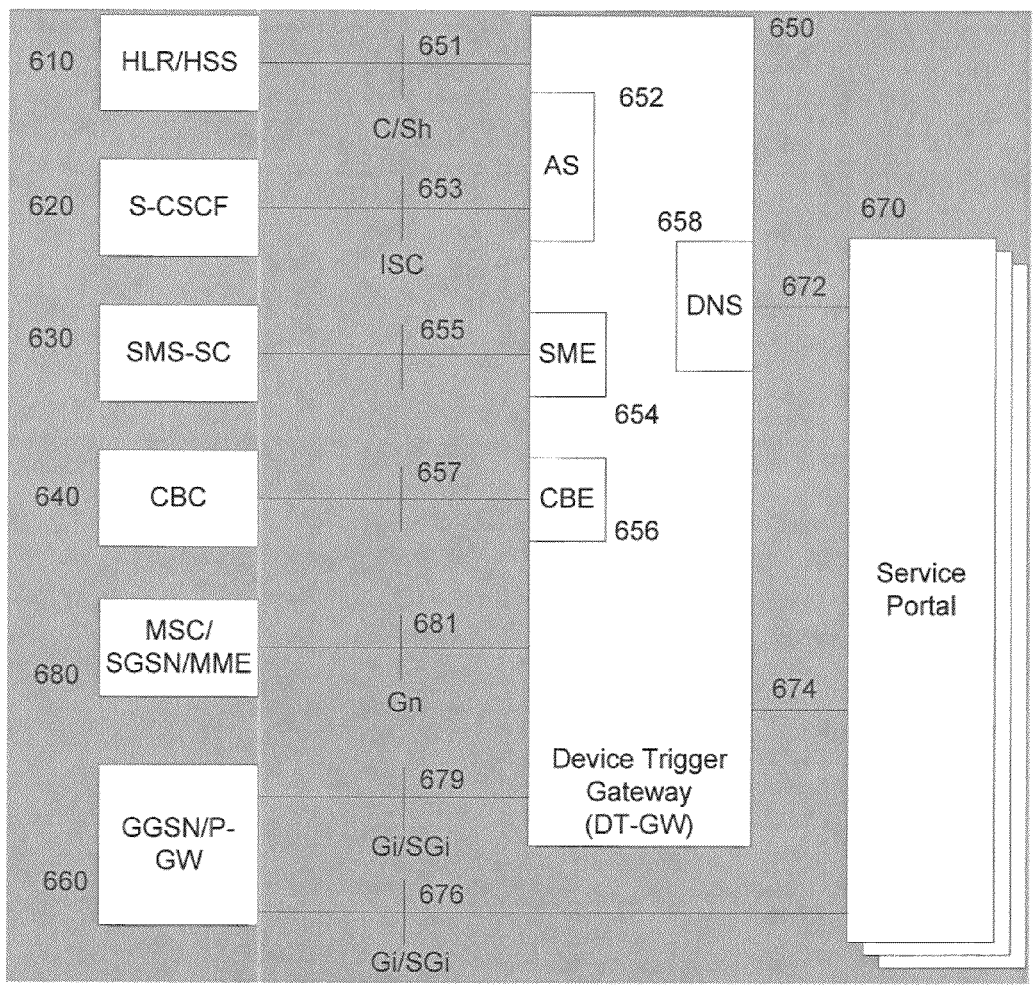
FIG. 6 illustrates a block diagram of a portion of an example network system according to some embodiments of the present technology.
Figure 7:
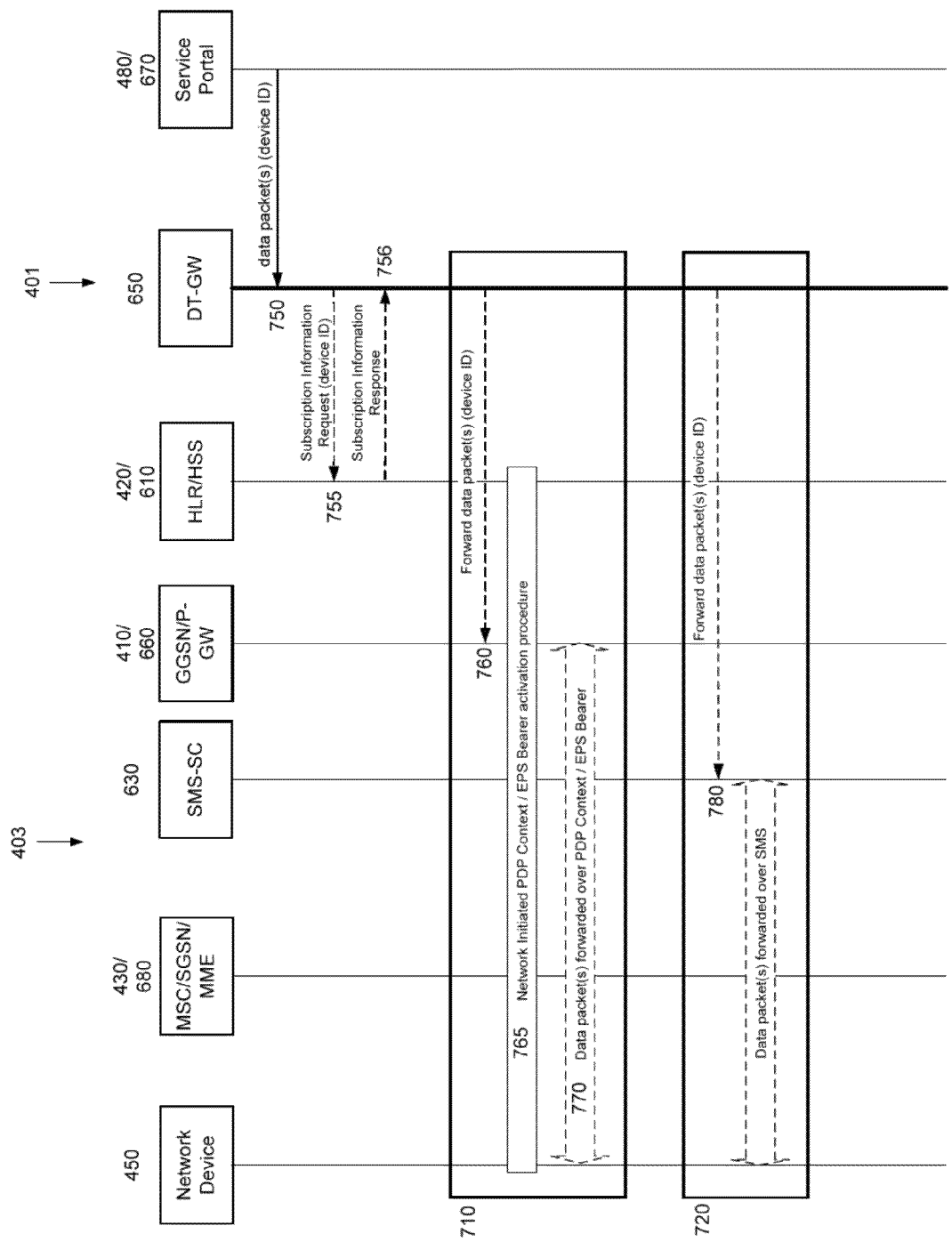
FIG. 7 illustrates a communication diagram for establishing forwarding data and/or data packets from a service portal to a network device using a DT-GW according to some embodiments of the present technology.

The instant example refers to a network system including a private network configured in accordance with Code Division Multiple Access (CDMA), General Packet Radio Service (GPRS), Universal Mobile Telecommunications System (UMTS), Evolved Packet System (EPS)/Long Term Evolution (LTE), Third ($3^{rd}$) Generation Partnership Project (3GPP) specifications and/or other specifications. With reference to FIG. 6 and FIG. 7, HLR refers to a Home Location Register, HSS refers to a Home Subscriber Server, S-CSCE refers to a Serving Call Session Control Function, SMS-SC refers to a Short Message Service Service Center, CBC refers to a Cell Broadcast Center, NB refers to Node-B or Base Transceiver Station, eNB refers to evolved Node B, MSC refers to a Message Switching Center, SGSN refers to a Serving GPRS Support Node, MME refers to a Mobility Management Entity, GGSN refers to Gateway GPRS Support Node, P-GW refers to Packet Data Network Gateway, AS refers to an IMS Application Server, SME refers to a Short Message Entity, CBE refers to a Cell Broadcast Entity, DT-GW refers to a Device Trigger Gateway routing device, C refers to the reference point interface between a DT-GW and a HLR, Sh refers to the reference point interface between the IMS AS capability of a DT-GW and an HSS, ISC refers to the reference point interface between the IMS AS capability of a DT-GW and a S-CSCF. Gn refers to the reference point interface between the DT-GW and a MSC, SGSN or MME, Gi refers to the reference point interface between a DT-GW and a GGSN, and SGi refers to the reference point interface between a DT-GW and a P-GW.

FIG. 6 illustrates a block diagram of a portion of an example network system according to some embodiments of the present technology. The network system includes a DT-GW 650, service portal 670, an HLR/HSS 610, a S-CSCF 620, a SMS-SC 630, a CBC 640, a MSC/SGSN/MME 680 and a GGSN/P-GW 660. The DT-GW 650 is communicatively connected with the service portal 670 via a communicative connection 674 and optionally via a communicative connection 672. The communicative connection 672 may be employed when the DT-GW includes/provides a Domain Name Service 658 for resolving names associated with PNDIs of network devices with the private network. Alternatively, the Domain Name Server may be provided as a separate entity from the DT-GW. The DT-GW 650 provides an interface between the private network and the public network and as such can be considered being part of the private network and the public network.

The DT-GW 650 includes at least some aspects of an AS 652, a SME 654, a CBE 656 and, as already mentioned, an optional DNS 658. The DT-GW 650 is configured to determine how a data packet is forwarded to one or more specific network devices within the private network. Specifically, the DT-GW 650 determines if a data packet is to be forwarded via communicative connection C/Sh 651, ISC 653, 655, 657, Gi/SGi 679 and/or Gn 681. If and when a globally routable packet data connection with the network device is made available and made known to a service portal 670, a data packet can also be forwarded to/from a network device via communicative connection Gi/SGi 676 between the service portal 670 and the GGSN/P-GW 660.

The DT-GW 650 is further configured to communicate with the HLR/HSS 610 via communicative connection 651 in order to determine the nature of any instant communicative connections (not illustrated) between a network device and the private network, if any. The DT-GW 650 in this example is configured to determine (not illustrated) an actual communicative connection (not illustrated) from the possible communicative connections between a network device and the private network in a predetermined manner. Each communicative connection may be associated with a different data delivery mechanism in the private network. For example, the DT-GW 650 is configured to select from the possible communicative connections based on an estimated amount of signalling and/or data traffic and/or time required to setup the communicative connection, if not already established, and forward data, the monetized trade-off costs associated with forwarding the data over the different possible communicative connections, the current private network congestion load over the different possible communicative connections, the type of data included in one or more data packets or other information indicated by available information, for example, including information included in one or more data packets including the payload of data packets and/or time required to setup and/or tear down a particular communicative connection. In some embodiments, estimating monetized trade-off costs may comprise estimating costs associated with establishing a connection and/or forwarding data via that connection, comparing the estimated costs for two or more connection types, and selecting, for example, the lowest-cost option. Benefits may be evaluated as negative costs. In some embodiments, if the type of data is determined to be "device trigger" data, that is, data intended to trigger a target network device into a certain operational state, this may affect the communicative connection selection.

For this purpose, the AS 652, the SME 654, and the CBE 656 functionality of the DT-GW 650 are configured to employ communication with the S-CSCF 620, a SMS-SC 630, a CBC 640, and a GGSN/P-GW 660 via corresponding communicative connections ISC 653, 655, 657, and/or Gi/SGi 679. The DT-GW 650 is further configured to employ communications with the MSC/SGSN/MME 680 via a corresponding communicative connection Gn 681. The DT-GW 650 is further configured to hand over communication with the GGSN/P-GW 660 directly to the service portal 670 under certain circumstances, for example, after performing one or more predetermined initialization tasks and/or initialization of corresponding communicative connections. FIG. 7 illustrates an exemplary communication diagram for forwarding data and/or data packets between a service portal 670 in the public network 401 and a network device 450 in the private network 403. The illustrated communication employs a DT-GW 650 to forward the data or data packets to the network device 450. Upon reception of the data and/or data packets 750 from the service portal 670, the DT-GW 650 may include communication 755/756 with the HLR/HSS 610 in order to gather information used to determine the delivery mechanism to use for forwarding of the data and/or data packets to the network device(s) 450 addressed by the data and/or data packets. After which, the DT-GW 650 uses this and other information to make a determination of the mechanism to use for delivery of the data and/or data packets to the network device 450. In one example 710, when a PDP context/EPS bearer is selected as the delivery mechanism, the DT-GW 650 forwards the data and/or data packets 760 to the appropriate GGSN/PGW 660. If the PDP context/EPS bearer is not established, the private network initiates the network initiated PDP context activation procedure 765. Once the PDP context/EPS bearer is available, the GGSN/PGW 660 forwards the data or data packets to the network device over the PDP context/EPS bearer 770. In another example 720, when SMS via a SMS-SC is selected as the delivery mechanism, the SMS-SC forwards the data and/or data packets 780 to the appropriate SMS-SC 630 who then forwards the data and/or data packets to the network device 450 using SMS 780. In other examples not illustrated in FIG. 7, other delivery mechanisms are selected according to some embodiments of the present technology.

The DT-GW 650 is configured for forwarding and/or facilitating setup of a communicative connection between the service portal 670 and one or more network devices within the private network once it has determined which specific communicative connection is to be used for forwarding data to/from a particular network device within the private network. As such, the DT-GW 650 may translate between corresponding PNDIs and the private network device identifiers and/or provide such information to one or more network components, for example, the GGSN/P-GW 660 and/or the service portal 670 in order to facilitate the forwarding of data to/from network devices in the private network. In addition, the DT-GW 650 may be configured to allow communication between network devices within the private network directly from within the private network and/or without involvement of network components within the public network (not illustrated). When a globally routable packet data connection is not currently available or known by a service portal 670, a request may be sent to the DT-GW 650 first, to trigger a globally routable packet data connection with the network device or inform the service portal 670 of the IP address and optionally TCP or UDP destination and/or source ports to be used to communicate directly with the network device.

It will be appreciated that, although specific embodiments have been described herein for purposes of illustration, various modifications may be made without departing from the spirit and scope of the technology. In particular, it is within the scope of the technology to provide a computer program product or program element, or a program storage or memory device such as a transmission medium, magnetic or optical wire, tape or disc, or the like, for storing signals readable by a machine, for controlling the operation of a computer according to the method of the technology and/or to structure its components in accordance with the system of the technology.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for forwarding data to network devices operatively connected to a private network, the method comprising:
   a. receiving data at a routing device, the routing device operatively connected with the private network and a public network;
   b. identifying, by the routing device, portions of said received data intended for at least one of the network devices by identifying a public network device identifier (PNDI) within said received data and associated with said portions of the received data, the PNDI including a public IP address of the routing device, a public first port number and a public second port number, the PNDI associated via the routing device with the at least one of the network devices;
   c. invoking a data delivery mechanism for use in forwarding said identified portions of said received data to the private network for receipt by the at least one of the network devices, wherein invoking said data delivery mechanism comprises: determining, via a lookup operation based on the PNDI, further identifiers to which each of said at least one of the network devices are respectively responsive, and using the determined further identifiers to contact each of said at least one of the network devices, said contact configured to trigger activation of a respective data connection between the routing device and each of said at least one of the network devices, said data connection used as said data delivery mechanism, and wherein said data connection is reachable from the public network by transmitting packets to the public IP address of the routing device, said packets specifying the public first port number as a source port number and the public second port number as a destination port number; and
   d. forwarding, by the routing device, said identified portions of said received data to the private network for receipt by the at least one of the network devices using the data delivery mechanism.

2. The method of claim 1, further comprising selecting the data delivery mechanism from a predetermined set of plural available data delivery mechanisms, wherein the predetermined set of available data delivery mechanisms comprises at least one member selected from the group comprising: a packet data protocol (PDP) context, an evolved packet subsystem (EPS) bearer, a circuit switched data connection, a Short Message Service (SMS), a Cell Broadcast Service (CBS), a Non Access Stratum (NAS) protocol, an Access Stratum (AS) protocol, an IP Multimedia Subsystem (IMS), and a Session Initiation Protocol (SIP).

3. The method of claim 1, further comprising selecting the data delivery mechanism from a predetermined set of plural available data delivery mechanisms, wherein selecting the data delivery mechanism is based at least in part on one or more of: an evaluation of which of the available data delivery mechanisms are currently set up for use with the at least one of the network devices; an estimation of network congestion associated with at least one of the one or more data delivery mechanisms; and monetized trade-off costs associated with forwarding the data over at least two of the one or more data delivery mechanisms.

4. The method of claim 1, further comprising selecting the data delivery mechanism from a predetermined set of plural available data delivery mechanisms, wherein selecting the data delivery mechanism is based at least in part on one or more of: a type of the received data; information obtained from one or more network components of the private network; and an estimation of resources required to set up a connection with the at least one of the network devices, to forward the received data to the at least one of the network devices, or both, said resources including one or more of: an amount of signaling, an amount of data traffic, and an amount of time.

5. The method of claim 1, further comprising forwarding data packets within the private network based on either a packet-data protocol (PDP) context or an evolved packet subsystem (EPS) bearer.

6. The method of claim 1, further comprising configuring the routing device as a Device Trigger Gateway (DT-GW) for initiating activation of a new packet-data protocol (PDP) context in coordination with a Serving GPRS Support Node (SGSN) or a MME.

7. A method for forwarding data to one or more network devices operatively connected to a private network, the method comprising:
   a. associating the one or more network devices with the public network via a public network device identifier (PNDI);
   b. receiving data at a routing device, the routing device operatively connected with the private network and a public network;
   c. identifying, by the routing device, portions of said received data intended for at least one of the one or more network devices, wherein identifying portions of said received data intended for the network device comprises identifying the PNDI, the PNDI including a public IP address of the routing device and a public first port number;
   d. invoking a data delivery mechanism for use in forwarding said identified portions of said received data to the private network for receipt by the at least one of the one or more network devices, wherein invoking said data delivery mechanism comprises: determining, via a lookup operation based on the PNDI, further identifiers to which each of said at least one of the network devices are respectively responsive, and using the determined further identifiers to contact each of said at least one of the network devices, said contact configured to trigger activation of a respective data connection between the routing device and each of said at least one of the network devices, said data connection used as said data delivery mechanism, and wherein said data connection is reachable from the public network by transmitting packets to the public IP address of the routing device, said packets specifying the public first port number as a source port number or a destination port number; and
   e. forwarding, by the routing device, said identified portions of said received data to the private network for receipt by the at least one of the one or more network devices using the data delivery mechanism.

8. The method of claim 7, wherein the public first port number corresponds with a TCP or UDP destination port number of a packet header of said received data.

9. The method of claim 7, wherein the PNDI further includes a public second port number corresponding with a TCP or UDP source port number of a packet header of said received data.

10. The method of claim 7, wherein the PNDI is associated with the at least one of the one or more network devices based on subscription data associated with the network device.

11. The method of claim 7, further comprising defining an association between the PNDI and a corresponding private network device identifier; and employing the corresponding private network device identifier for forwarding each received data packet associated with the PNDI to network devices in the private network based on the association.

12. The method of claim 11, further comprising providing the association by including the corresponding private network device identifier in one or both of: the data packet, and a translation table.

13. The method of claim 11, wherein the private network device identifier includes an identifier selected from the group comprising: a private network device address along with a private first port number; a mobile subscriber integrated services digital network number (MSISDN); and at least a portion of an Integrated Circuit Card ID (ICCID).

14. The method of claim 7, wherein two or more of the one or more network devices are assigned the same public network device identifier.

15. The method of claim 7, further comprising receiving, at the routing device, a request for a public identifier associated with at least one of the one or more network devices, and providing a response to the request by the routing device, the response indicative of the public identifier.

16. A network system for forwarding data between network devices, the system comprising:
   a. one or more network devices operatively connected with a private network; and
   b. a routing device operatively connected with the private network, the routing device configured to: receive data intended for forwarding to at least one of the one or more network devices, identify portions of said received data by identifying a public network device identifier (PNDI) within said received data and associated with said portions of the received data, the PNDI including a public IP address of the routing device, a public first port number and a public second port number, the PNDI associated via the routing device with the at least one of the network devices, invoke a data delivery mechanism for use in forwarding the received data to the at least one of the one or more network devices, wherein invoking said data delivery mechanism comprises: determining via a lookup operation based on the PNDI, further identifiers to which each of said at least one of the network devices are respectively responsive, and using the determined further identifiers to contact each of said at least one of the network devices, said contact configured to trigger activation of a respective data connection between the routing device and each of said at least one of the network devices, said data connection used as said data delivery mechanism, and wherein said data connection is reachable from the public network by transmitting packets to the public IP address of the routing device, said packets specifying the public first port number as a source port number and the public second port number as a destination port number; and forward the received data from the routing device to the at least one of the one or more network devices using the data delivery mechanism.

17. The system of claim 16, further comprising selecting the data delivery mechanism from a predetermined set of plural available data delivery mechanisms, wherein selecting the data delivery mechanism is based at least in part on one or more of: a type of the received data; information obtained from one or more network components of the private network; and an estimation of resources required to set up a connection with the at least one of the one or more network devices, to forward the received data to the at least one of the one or more network devices, or both, said resources including one or more of: an amount of signaling, an amount of data traffic, and an amount of time.

18. The system of claim 16, further comprising selecting the data delivery mechanism from a predetermined set of plural available data delivery mechanisms, wherein selecting the data delivery mechanism is based at least in part on one or more of: an evaluation of which of the available data delivery mechanisms are currently set up for use with the at least one of the one or more network devices; an estimation of network congestion associated with at least one of the one or more data delivery mechanisms; and monetized trade-off costs associated with forwarding the data over at least two of the one or more data delivery mechanisms.

19. A network system for forwarding data between network devices, the system comprising:
   a. one or more network devices for operative connection with a private network; at least one of the one or more network devices associated with a public network via a public network device identifier (PNDI), the public network device identifier including a public routing device address, a public first port number and a public second port number; and
   b. a routing device for operative connection with the private network and a public network; the routing device configured for operative association with the public network via the public routing device address; the routing device configured to invoke a data delivery mechanism from a predetermined set of plural available data delivery mechanisms for use in forwarding the received data, and forward to the private network using the data delivery mechanism, for receipt by the at least one of the one or more network devices, each received data packet associated with the PNDI, wherein a destination network address corresponds with the public routing device address and a destination port number corresponds with the public first port number, wherein invoking said data delivery mechanism comprises: determining, via a lookup operation based on the PNDI, further identifiers to which each of said at least one of the network devices are respectively responsive, and using the determined further identifiers to contact each of said at least one of the network devices, said contact configured to trigger activation of a respective data connection between the routing device and each of said at least one of the network devices, said data connection used as said data delivery mechanism, and wherein said data connection is reachable from the public network by transmitting packets to the public IP address of the routing device, said packets specifying the public first port number as a source port number and the public second port number as a destination port number.

20. A computer program product comprising a computer readable memory storing computer executable instructions thereon that when executed by a computer perform the method of claim 1.

21. A computer program product comprising a computer readable memory storing computer executable instructions thereon that when executed by a computer perform the method of claim 7.

22. The system according to claim 19, wherein a source port number corresponds with the public second port number.

23. The method of claim 1, wherein contacting one of said at least one of the network devices comprises forwarding a Short Messaging Service (SMS) message to a Short Message Service Center (SMSC), the SMS specifying a predetermined reserved MSISDN, the SMSC configured, upon recognition of the reserved MSISDN, to inspect a payload of the SMS message for a PNDI contained therein, and to perform a lookup of said one of said at least one of the network devices based on the PNDI.

24. The method of claim 1, wherein the data connection is an Internet Protocol (IP) based data connection.

25. The method of claim 1, wherein the further identifier is an International Mobile Subscriber Identity (IMSI).

* * * * *

UNITED STATES PATENT AND TRADEMARK OFFICE
CERTIFICATE OF CORRECTION

PATENT NO. : 9,037,724 B2  
APPLICATION NO. : 13/368914  
DATED : May 19, 2015  
INVENTOR(S) : Kavanaugh et al.

It is certified that error appears in the above-identified patent and that said Letters Patent is hereby corrected as shown below:

In the Specification:

In column 5, line 4, delete "H214" and insert --H2H--;

In column 5, line 67, delete "hearer" and insert --bearer--;

In column 17, line 23, delete "S-CSCE" and insert --S-SCSF--.

Signed and Sealed this  
Twenty-second Day of December, 2015

Michelle K. Lee  
*Director of the United States Patent and Trademark Office*